United States Patent
Hendricks

(10) Patent No.: US 6,789,313 B2
(45) Date of Patent: Sep. 14, 2004

(54) PISTON PIN LOCK RING INSERTION TOOL AND METHOD

(76) Inventor: George P. Hendricks, 1561 Missouri Ave., Sanford, FL (US) 32771

(*) Notice: Subject to any disclaimer, the term of this patent is extended or adjusted under 35 U.S.C. 154(b) by 85 days.

(21) Appl. No.: 10/298,887

(22) Filed: Nov. 15, 2002

(65) Prior Publication Data

US 2004/0093728 A1 May 20, 2004

(51) Int. Cl.$^7$ ................................................ B23P 19/04
(52) U.S. Cl. ........................ 29/888.04; 29/888.042; 29/888.049; 29/888.05; 29/222; 29/225; 29/229; 29/235; 29/269; 29/275
(58) Field of Search ...................... 29/888.04, 888.05, 29/888.042, 222, 225, 229, 235, 243.56, 269, 270, 275, 282, 888.049

(56) References Cited

U.S. PATENT DOCUMENTS

| | | | |
|---|---|---|---|
| 1,740,590 A | * 12/1929 | Hartman | 29/275 |
| 2,357,139 A | 8/1944 | Seme | |
| 2,488,001 A | * 11/1949 | Birk | 29/275 |
| 2,839,823 A | * 6/1958 | Brancato | 29/275 |
| 3,030,677 A | * 4/1962 | Kindt et al. | 164/385 |
| 3,030,700 A | 4/1962 | Jensen | |
| 3,134,168 A | * 5/1964 | Erdmann | 221/251 |
| 3,631,688 A | 1/1972 | Quick | |
| 3,995,360 A | * 12/1976 | Millheiser | 29/229 |
| 4,514,889 A | 5/1985 | Ferlan et al. | |
| 5,146,676 A | 9/1992 | Cuba | |
| 5,794,984 A | 8/1998 | Bartholomew | |
| 6,113,306 A | 9/2000 | Allert | |
| 6,389,667 B1 | 5/2002 | Cook et al. | |
| 6,507,985 B1 | * 1/2003 | Loughlin et al. | 29/229 |

FOREIGN PATENT DOCUMENTS

| | | | |
|---|---|---|---|
| DE | 3041260 | * | 5/1982 |
| DE | 3824617 | * | 10/1989 |
| FR | 2649349 | * | 1/1991 |
| JP | 62-039133 | * | 2/1987 |
| JP | 02-024028 | * | 1/1990 |

* cited by examiner

Primary Examiner—David P. Bryant
Assistant Examiner—Eric Compton
(74) Attorney, Agent, or Firm—Edward M. Livingston, P.A.

(57) ABSTRACT

A piston-pin lock-ring-insertion tool has a ring-insertion tube (1) in ring-insertion relationship to a ring pusher (2). The ring-insertion tube has an inside periphery with a press-close taper (8) that is tapered inwardly from a ring-feeder end (6) to a ring-guide bore (9) that is cylindrical uniformly intermediate the press-close taper and a ring-insertion end of the ring-insertion tube. The ring-insertion end (7) of the ring-insertion tube has a perpendicularity surface (10) that is adapted for alignment of the ring-guide bore and a piston-pin bore (4) in a crankshaft-engine piston (5). The ring pusher has a pusher taper (26) with a pusher head (12) adapted for being buttressed against a side of lock ring (3) for pushing the lock ring from a major diameter to a minor diameter of the press-close taper proximate a circumferential entrance to the ring-guide bore. The ring pusher has a slide rod (13) that is oppositely disposed end-to-end from the pusher head. The slide rod has a cylindrical outside periphery that slides against an inside periphery of the ring-guide bore. The slide rod has an insertion plunger (14) on a cylindrical step inwardly to a center rod (15) that is extended concentrically from the insertion plunger.

A use method includes pushing a lock ring sidewardly with the pusher head to the ring-guide bore, reversing the ring pusher end-to-end, inserting the center rod into the lock ring, aligning the center rod with the piston-pin bore, and pushing the lock ring into an internal lock-ring groove (29) in the piston-pin bore.

27 Claims, 6 Drawing Sheets

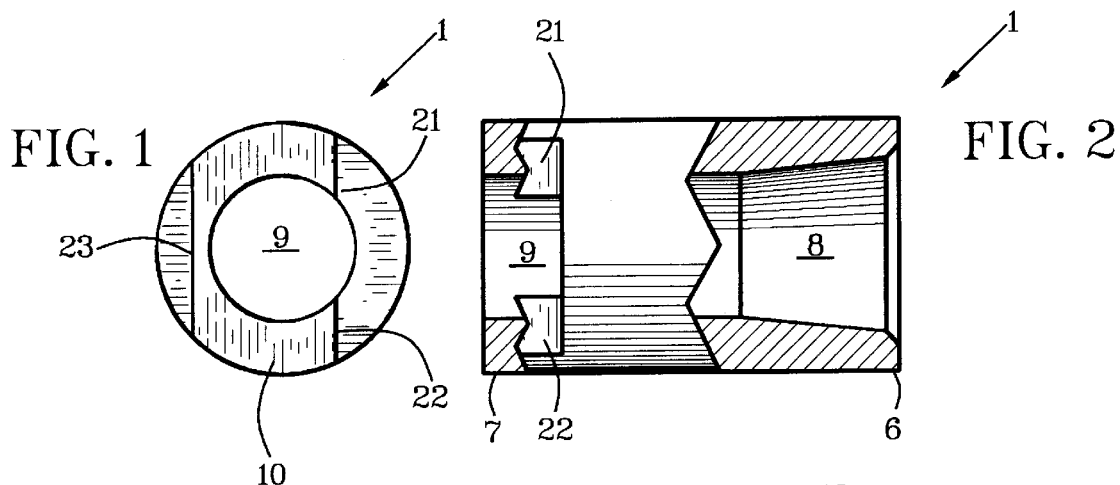
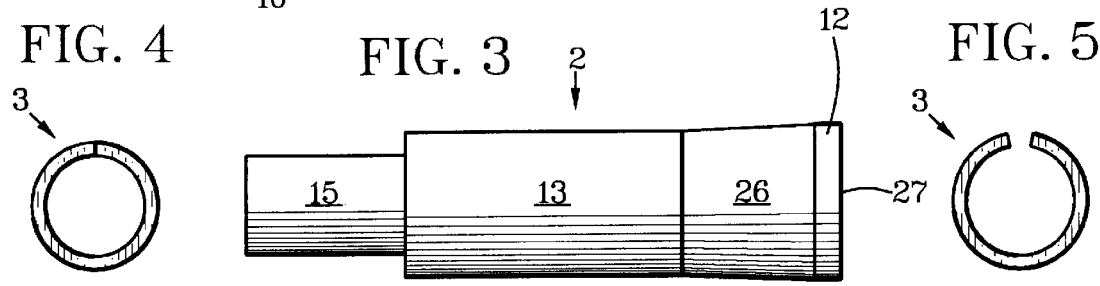
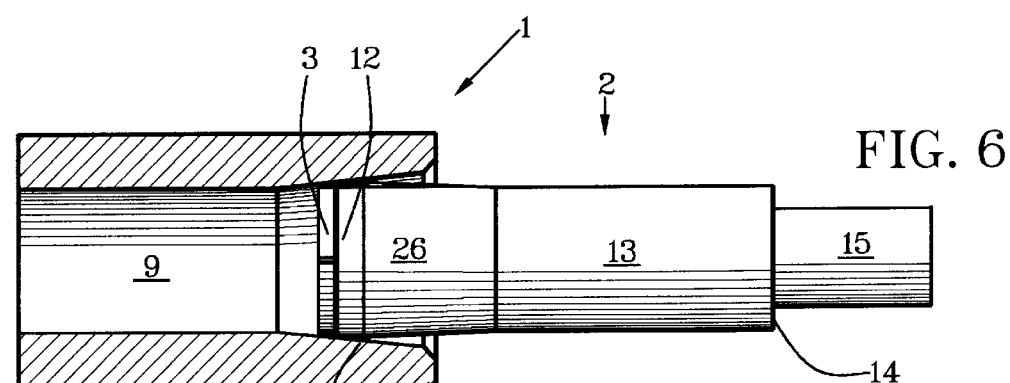
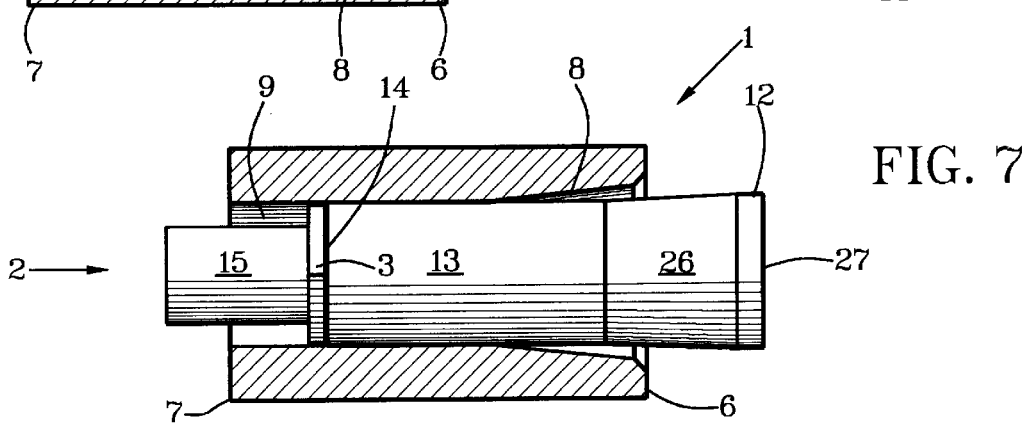

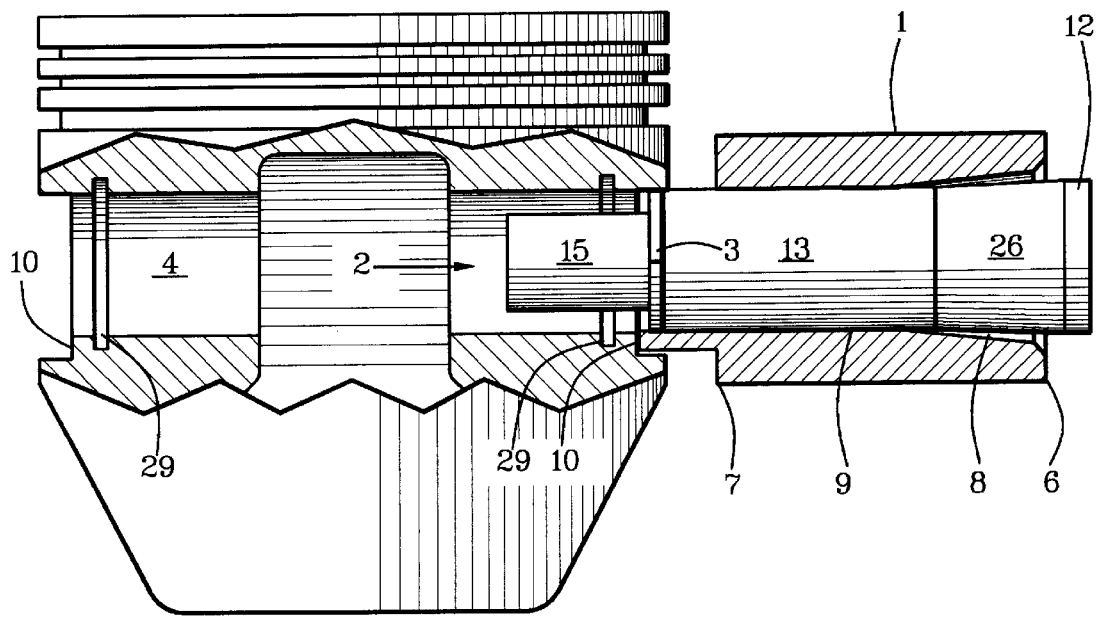
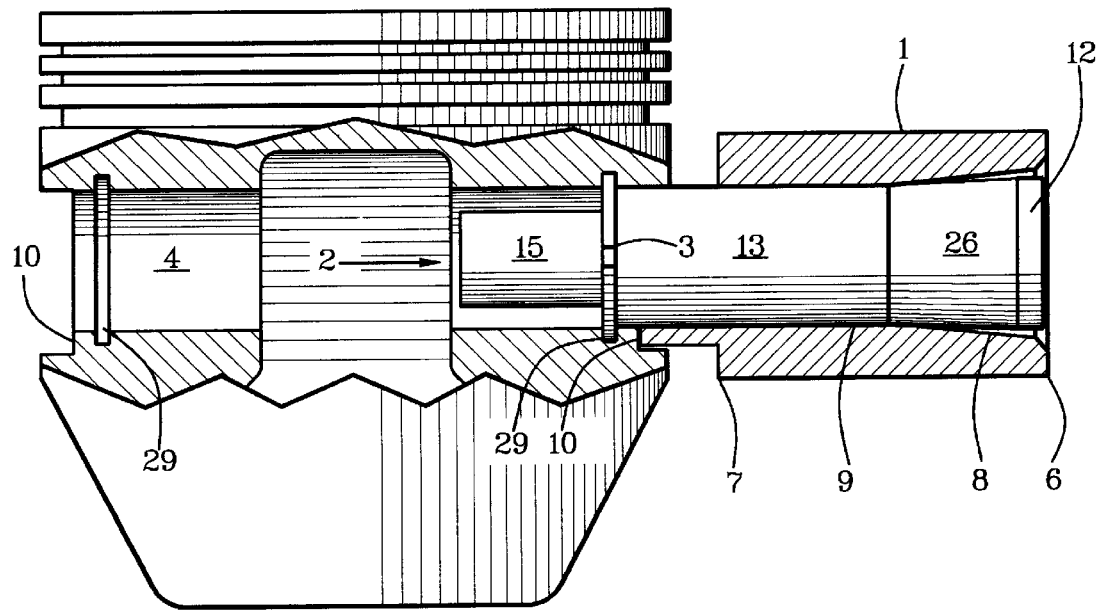

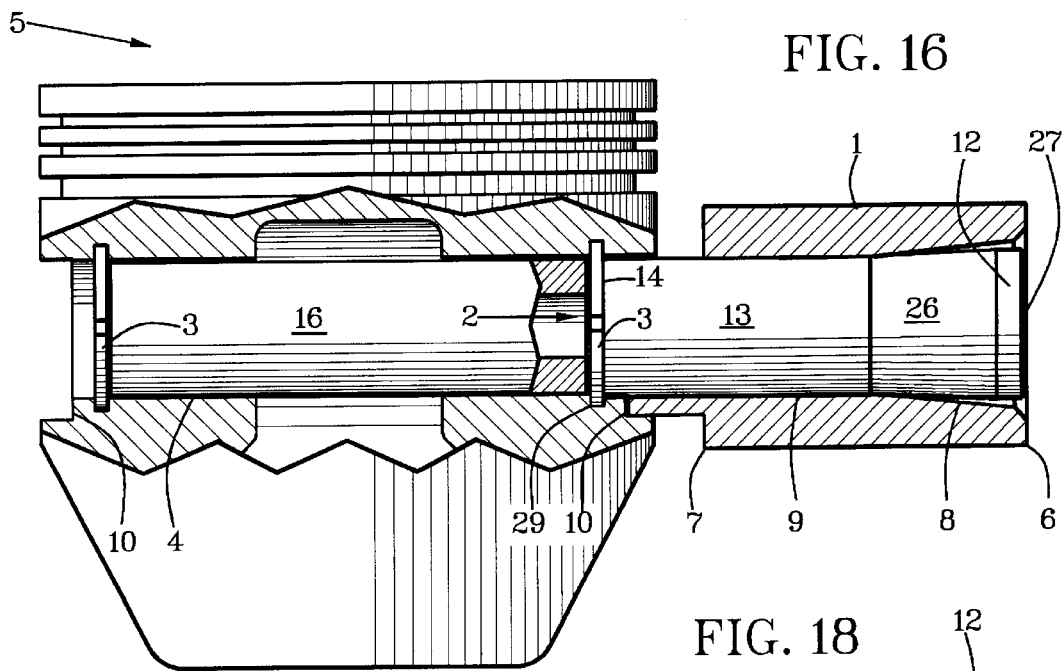
FIG. 16
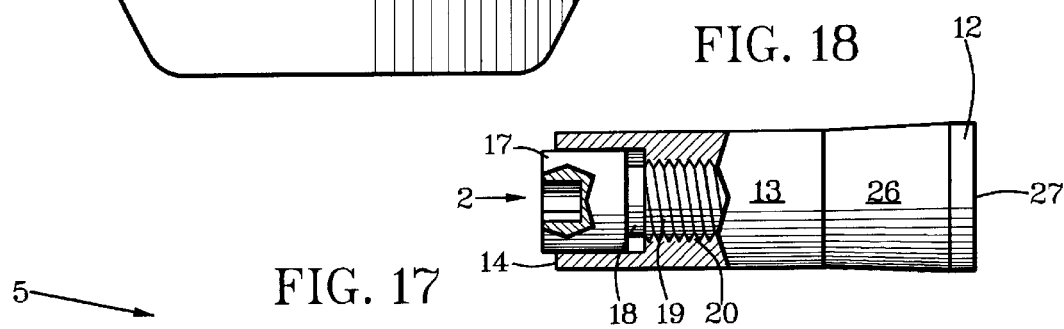
FIG. 18
FIG. 17
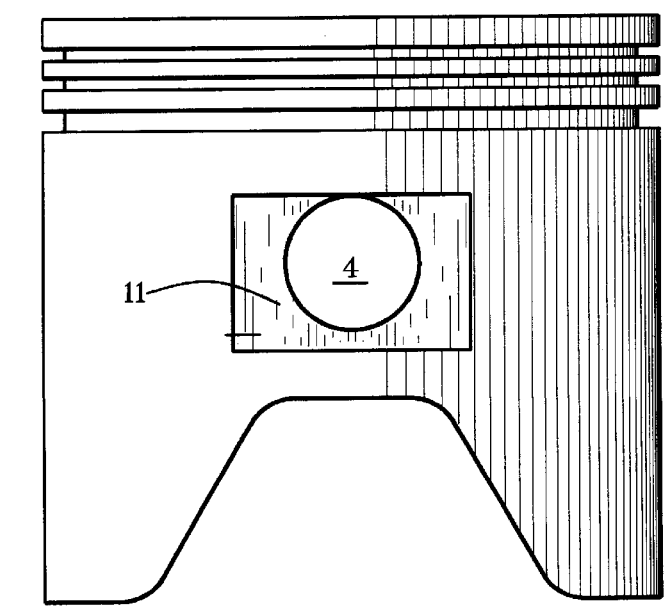

PISTON PIN LOCK RING INSERTION TOOL AND METHOD

BACKGROUND OF THE INVENTION

This invention relates to a hand tool for inserting an internal retainer ring, lock ring or snap ring in a piston-pin bore and other bores.

A large portion of pistons for crankshaft engines are made to utilize an internal snap ring, referred to as a lock ring, in each end of a piston-pin bore for preventing side travel of a piston pin. Pistons for aftermarket use are supplied separately from connecting rods and piston pins for which the piston pins are used to assemble them together. Conventional assembly for repair and rebuilding of engines is a long and tedious task. It is accomplished with general-purpose tools like screwdrivers, picks and pliers with which even experienced workers often mar and damage the pistons.

There is no known hand tool for inserting the lock ring quickly, conveniently and safely in a manner taught by this invention.

Examples of most-closely related known but different devices are described in the following patent documents:

| U.S. Pat. No. | Inventor | Issue Date |
| --- | --- | --- |
| 2,357,139 | Seme | Aug. 29, 1944 |
| 4,514,889 | Ferlan, et al. | May 7, 1985 |
| 5,146,676 | Cuba | Sep. 15, 1992 |
| 3,631,688 | Quick | Jan. 4, 1972 |
| 6,389,667 | Cook, et al. | May 21, 2002 |
| 5,794,984 | Bartholomew | Aug. 18, 1998 |
| 3,030,700 | Jensen | Apr. 24, 1962 |
| 6,113,306 | Allert | Sep. 5, 2000 |

SUMMARY OF THE INVENTION

Objects of patentable novelty and utility taught by this invention are to provide a piston-pin lock-ring-insertion tool which:

- decreases engine-assembly time for inserting lock rings in pistons from an hour or more to about one minute;
- avoids marring of pistons with general-purpose tools now used for inserting; and decreases worker fatigue;
- avoids occasional injury from use of the general-purpose tools in adverse tool-use conditions; and
- can be used for insertion of a wide selection of internal retainer rings.

This invention accomplishes these and other objectives with a piston-pin lock-ring-insertion tool having a ring-insertion tube in ring-insertion relationship to a ring pusher. The ring-insertion tube has an inside periphery with a press-close taper that is tapered inwardly from a ring-feeder end to a ring-guide bore that is cylindrical uniformly intermediate the press-close taper and a ring-insertion end of the ring-insertion tube. The ring-insertion end of the ring-insertion tube has a perpendicularity surface that is adapted for alignment of the ring-guide bore and a piston-pin bore in a crankshaft-engine piston. The ring pusher has a pusher taper with a pusher head adapted for being buttressed against a side of lock ring for pushing the lock ring from a major diameter to a minor diameter of the press-close taper proximate a circumferential entrance to the ring-guide bore. The ring pusher has a slide rod that is oppositely disposed end-to-end from the pusher head. The slide rod has a cylindrical outside periphery that slides against an inside periphery of the ring-guide bore. The slide rod has an insertion plunger on a cylindrical step inwardly to a center rod that is extended concentrically from the insertion plunger.

A use method includes pushing a lock ring sidewardly with the pusher head to the ring-guide bore, reversing the ring pusher end-to-end, inserting the center rod into the lock ring, aligning the center rod with the piston-pin bore, and pushing the lock ring into an internal groove in the piston-pin bore.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF DRAWINGS

This invention is described by appended claims in relation to description of a preferred embodiment with reference to the following drawings which are explained briefly as follows:

FIG. 1 is front view of a ring-insertion end of a ring-insertion tube;

FIG. 2 is a partially cutaway side view of the ring-insertion tube;

FIG. 3 is a side view of a ring pusher;

FIG. 4 is a front view of a lock ring, also known as an internal snap ring or retainer ring, in a pressed-close mode;

FIG. 5 is a side view of the lock ring of the FIG. 3. illustration in a spring-pressured open mode;

FIG. 6 is a partially cutaway side view of the ring-insertion tube with the lock ring in a press-close taper where it is being pushed from a ring-feed position in the press-close taper to a ring-guide bore with a pusher head of the ring pusher;

FIG. 7 is a partially cutaway side view of the ring-insertion tube with the lock ring in the ring-guide bore where it is being pushed to a ring-insertion end of the ring-guide bore with an insertion plunger on the ring pusher;

FIG. 8 is a partially cutaway side view of a crankshaft-engine piston without a lock-ring groove in either end of a piston-pin bore, without a piston pin in a piston-pin bore and having a ring-insertion end of the ring-insertion tube placed against a flat of a first piston-wall depression;

FIG. 9 is a partially cutaway side view of the FIG. 8 illustration with the lock ring having been pushed into the lock-ring bore and expanded into a snap-ring groove;

FIG. 16 is the FIG. 15 illustration with the lock ring having been set in the second lock-ring groove without contact or engagement of the center rod with the piston pin;

FIG. 17 is a side elevation view of a piston having a piston-wall depression with a top edge being too close to the piston-pin bore to receive a perpendicularity surface on the ring-insertion end of the ring-insertion tube without first and second side wall oppositely disposed from an open portion of the ring-guide bore;

FIG. 18 is a partially cutaway side view of the ring pusher having an adjustable-length center pin;

DESCRIPTION OF PREFERRED EMBODIMENT

Figure 10:
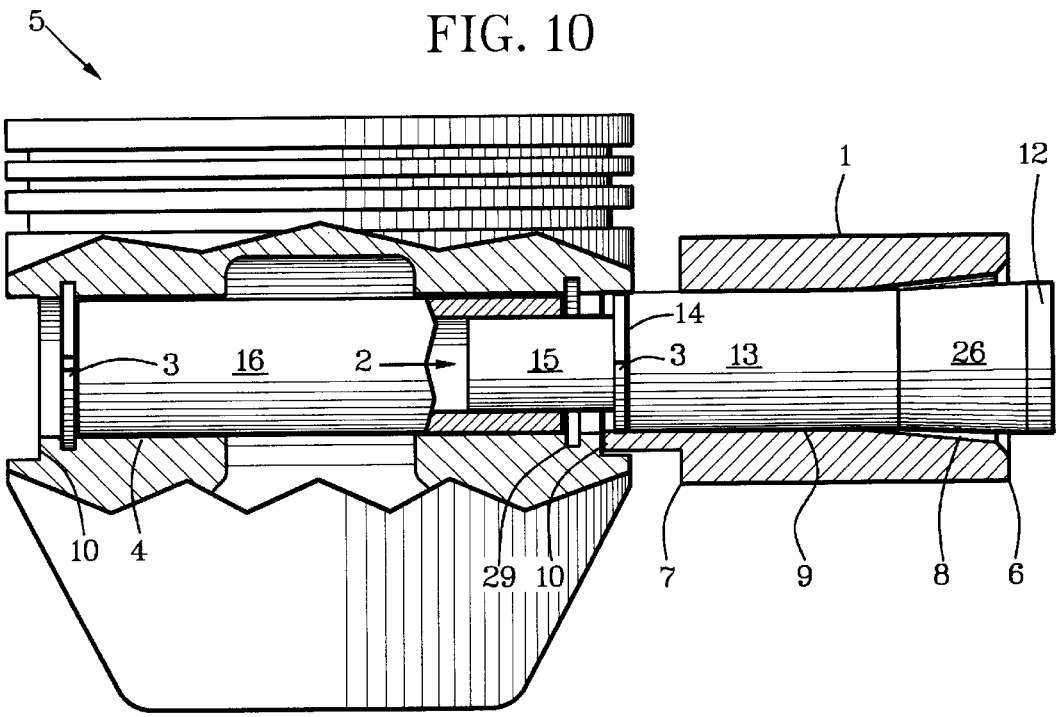
FIG. 10 is a partially cutaway side view of a crankshaft-engine piston with a lock ring in a first end of the piston-pin bore, with a piston pin in a piston-pin bore and having a ring-insertion end of the ring-insertion tube placed against a flat of a second piston-wall depression.

Listed numerically below with reference to the drawings are terms used to describe features of this invention. These terms and numbers assigned to them designate the same features throughout this description.

1. Ring-insertion tube
2. Ring pusher
3. Lock ring
4. Piston-pin bore
5. Piston
6. Ring-feeder end
7. Ring-insertion end
8. Press-close taper
9. Ring-guide bore
10. Perpendicularity surface
11. Flat surface
12. Pusher head
13. Slide rod
14. Insertion plunger
15. Center rod
16. Piston pin
17. Adjustable-length center rod
18. Threaded stem
19. External helical threads
20. Internal helical threads
21. First side wall -continued 22. Second side wall
23. Third side wall
24. Tube taper
25. Step wall
26. Pusher taper
27. Pusher surface
28. Pusher flange
29. Lock-ring groove Referring to FIGS. 1–9, a ring-insertion tube 1 has working relationship to a ring pusher 2 for inserting a lock ring 3 into a lock-ring groove 29 in a bore that can include a piston-pin bore 4 in a piston 5 for a crankshaft engine that is not shown. The ring-insertion tube 1 has a ring-feeder end 6 that is oppositely disposed from a ring-insertion end 7. The ring-insertion tube 1 has an inside periphery with a press-close taper 8 that is internal and tapered inwardly with a predetermined taper angle from the ring-feeder end 6 funneled to a ring-guide bore 9.

The ring-guide bore 9 has an inside periphery that is cylindrical uniformly intermediate the press-close taper 8 and a ring-insertion end of the ring-guide bore 9.

The press-close taper 8 and the ring-guide bore 9 have axes that are concentric.

The ring-guide bore 9 has an inside periphery that is adapted for sliding contact of an outside periphery of the lock ring 3 in a pressed-close mode, shown in FIGS. 4, 8, 10, and 15, from the press-close taper 8 for being slid into an inside periphery of the piston-pin bore 4.

The ring-insertion end 7 of the ring-insertion tube 1 has a perpendicularity surface 10 that is perpendicular to the axes of the press-close taper 8 and the ring-guide bore 9 for placing the perpendicularity surface 10 against a surface, which can include a flat surface 11 of a piston-wall depression shown in FIGS. 8–11, 15–17 and 19–20, surrounding an entrance to the piston-pin bore 4.

The ring pusher 2 has a pusher head 12 on a ring-guide end adapted for being buttressed against a side of the lock ring 3 for pushing the lock ring 3 from a major diameter of the press-close taper 8 to a minor diameter of the press-close taper 8 proximate a circumferential entrance to the ring-guide bore 9 for closing the lock ring 3 selectively;

The ring pusher 2 has a slide rod 13 that is oppositely disposed linearly from the pusher head 12. The slide rod 13 has a cylindrical outside periphery that slides against the inside periphery of the ring-guide bore 9. The outside periphery of the slide rod 13 is adapted for being inserted predeterminedly into an inside periphery of the piston-pin bore 4.

An insertion plunger 14 is on a circumferential step intermediate the outside periphery of the slide rod 13 and a center rod 15 on a ring-guide end of the slide rod 13. The center rod 15 is extended concentrically from the slide rod 13 and the center rod 15 is adapted for entry predeterminedly into the inside periphery of the lock ring 3.

Figure 11:
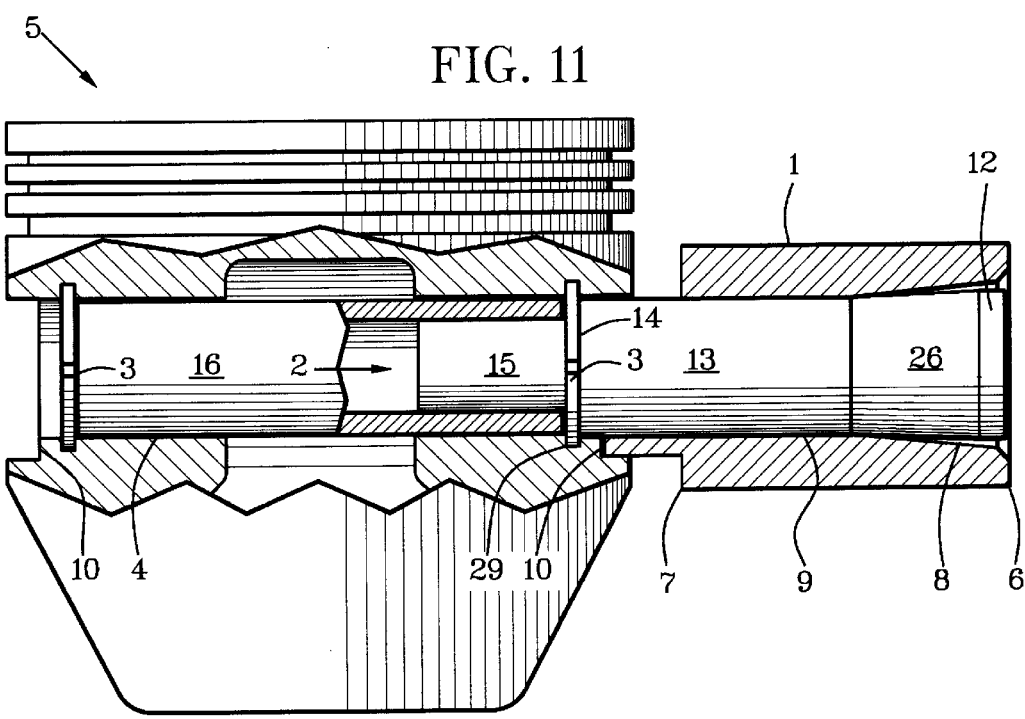
FIG. 11 is a partially cutaway side view of the FIG. 10 illustration with a second lock ring having been pushed into the lock-ring bore and expanded into a second snap-ring groove.

The center rod 15 can include a circumferential outside periphery that is adapted for entry into an inside periphery of a piston pin 16 in the piston 5 for aligning an axis of the piston pin 16, shown in FIGS. 10–11, and the slide rod 13 concentrically with an axis of the piston-pin bore 4.

Figure 12:
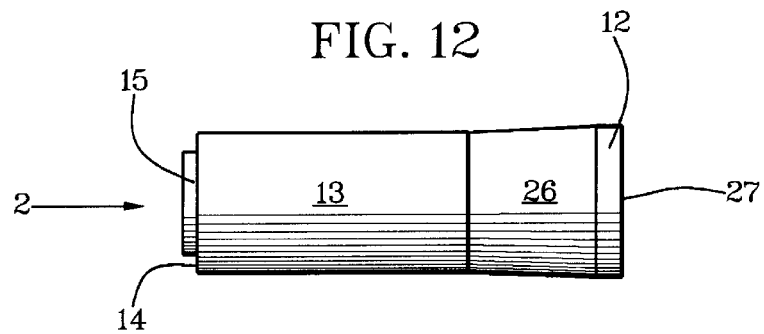
FIG. 12 is a side view of the ring pusher having a center rod with a length proximate a width of a lock ring for avoiding contact with piston pins and other objects not having internal peripheral area for receiving the center rod.
Figure 14:
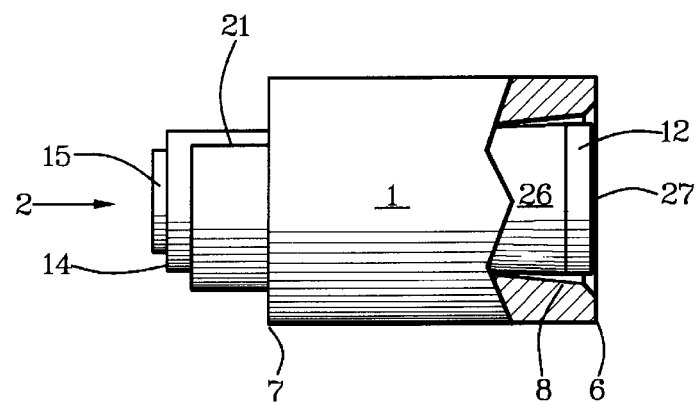
FIG. 14 is a partially cutaway side view of the FIG. 12 ring pusher in the FIGS. 13 ring-insertion tube.
Figure 15:
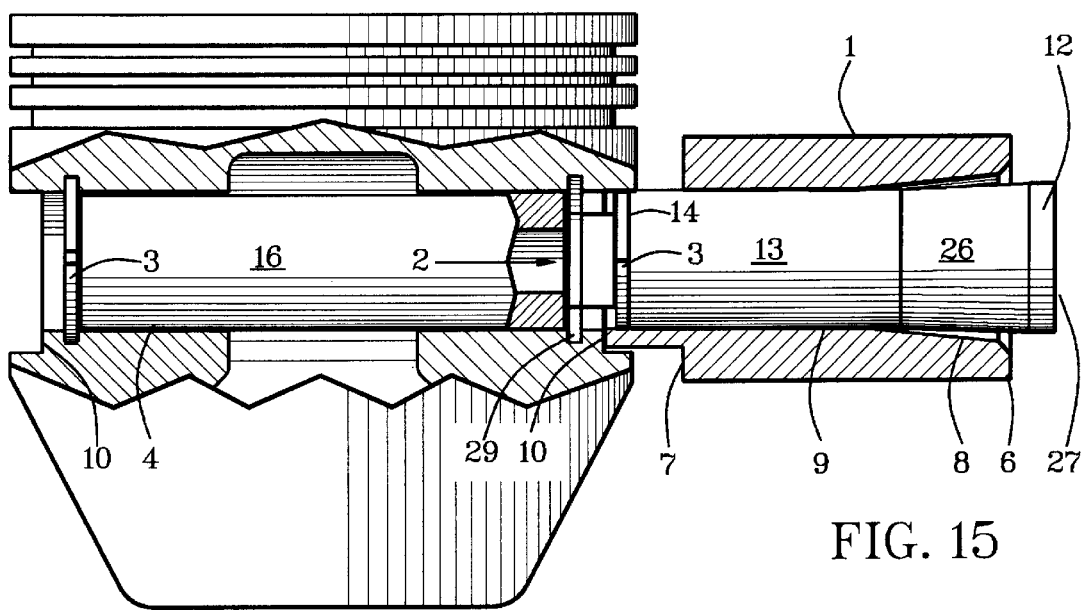
FIG. 15 is a partially cutaway side view of a crankshaft-engine piston with a lock ring in a first end a piston-pin bore, with a piston pin in a piston-pin bore having an internal periphery with an area too small to receive a center rod, with the center rod having a length proximate a width of the lock ring and with the lock ring positioned on the center rod for insertion into the lock-ring bore without contacting or entering the piston pin.
Figure 19:
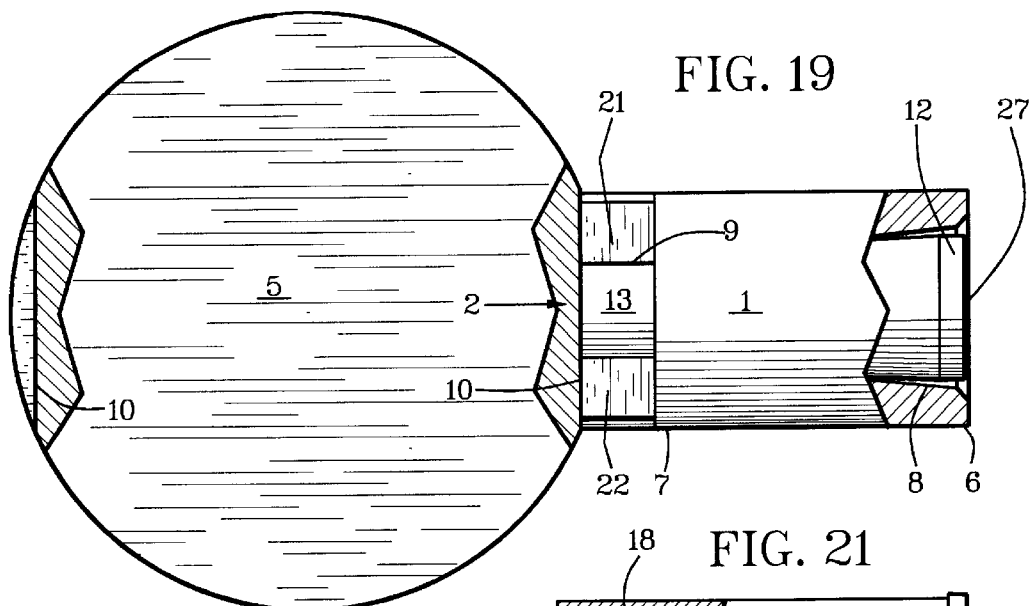
FIG. 19 is a partially cutaway top view of a piston with the perpendicularity surface of the ring-insertion tube being positioned with the open portion of the ring-guide bore being downward vertically from the top edge of the piston-wall depression.

The center rod 15 can include a linear length that is proximate a thickness of the lock ring 3 as shown in FIGS. 12 and 14 and as being hidden by the lock ring 3 in FIGS. 15–16. The short length of the center rod 15 avoids contact or engagement of the center rod 15 with piston pins 16 having small internal areas or that are solid. Generally, piston pins 16 for smaller engines and smaller equipment have smaller inside areas that require the short ring-width center rods 15.

Figure 21:
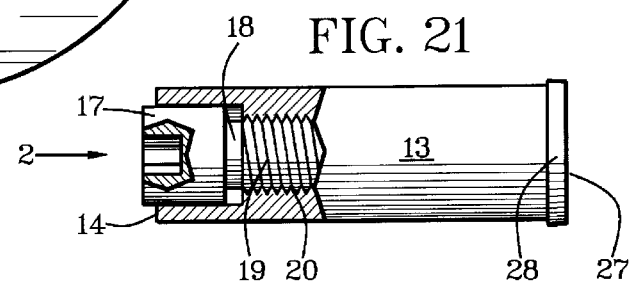
FIG. 21 is a partially cutaway side view of the ring pusher with the adjustable-length center rod and having a pusher-head flange tapered outwardly.

The center rod 15 can include an adjustable-length center rod 17 as shown in FIGS. 18 and 21. The adjustable-length center rod 17 can include a threaded stem 18 having external helical threads 19 that are screwed into internal helical threads 20 in the slide rod 13.

Figure 13:
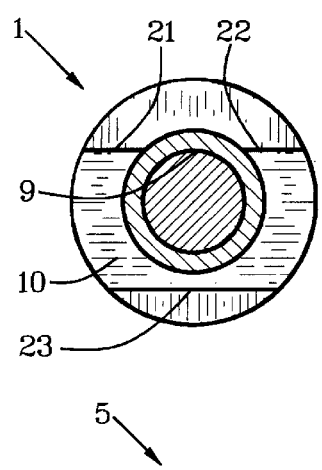
FIG. 13 is a front view of the FIG. 1 illustration of a ring-insertion tube rotated ninety degrees to illustrate positioning of a perpendicularity surface with walls on a perpendicularity boss on opposite sides of an open portion of the ring-guide bore.

Referring to FIGS. 1 and 13, the perpendicularity surface 10 can include a perpendicularity boss positioned perpendicularly to at least one flat side wall. The perpendicularity boss can be positioned about a predetermined portion of the ring-guide bore 9 on the ring-insertion end 7 of the ring-insertion tube 1. The flat side wall can include a first side wall 21 on a first side of an open portion of the ring-guide bore 9 and a second side wall 22 on a second side of the open portion of the ring-guide bore 9. The first side wall 21 and the second side wall 22 are in a common plane that is parallel to the axis of the ring-guide bore 9 on oppositely disposed sides of the open portion of ring-guide bore 9. The flat side wall can include a third side wall 23 that is parallel to the axis of the ring-guide bore 9. The third side wall 23 defines a base of an arc at a predetermined distance laterally from the ring-guide bore 9.

Figure 22:
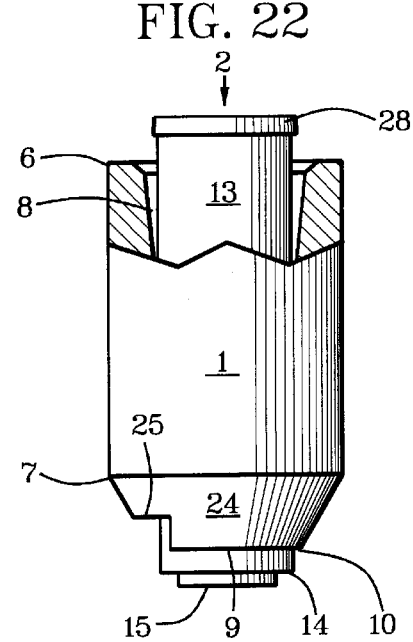
FIG. 22 is a partially cutaway side elevation view of the ring-insertion tube having a tapered ring-insertion end about a perpendicularity surface and with a ring pusher having a tapered-flange pusher head and ring-width center rod inserted into it.

Referring to FIG. 22, the perpendicularity surface 10 can be positioned predeterminedly about the ring-guide bore 9 on the ring-insertion end 7 of the ring-insertion tube 1. The ring-insertion tube 1 can include a tube taper 24 which can include a positioning step having a step wall 25 that is perpendicular to the ring-guide bore 9 at a position predeterminedly intermediate a surface of the external circumferential taper and the ring-guide bore 9.

As shown in FIGS. 3, 6–16 and 18–19, the ring pusher 2 can include a pusher taper 26 that is tapered inwardly at a taper angle that is proximate a taper angle of the press-close taper 8. The pusher taper 26 is extended from proximate an outside edge of the pusher surface 27 to an outside periphery of the slide rod 13. The outside edge of the pusher surface 27 includes an external periphery that is predeterminedly smaller than an internal periphery of an internal major diameter of the press-close taper 8 proximate the ring-feeder end 6 of the ring-insertion tube 1 for allowing predetermined entry of the pusher surface 27 into the press-close taper 8.

As shown in FIGS. 21–22, the pusher head 12 can include a pusher flange 28 that is extended outward radially from the slide rod 13. The pusher surface 27 is on the ring-feed end of the of the ring pusher 2. An outside edge of the pusher surface 27 can include an external periphery that is predeterminedly smaller than the internal periphery of the internal major diameter of the press-close taper 8 proximate the ring-feeder end 6 of the ring-insertion tube 1 for allowing predetermined entry of the pusher surface 27 into the press-close taper 8. The pusher flange 28 can include a predetermined flange width intermediate the pusher surface 27 and a rod side of the pusher flange 28. The pusher flange 28 can include a laterally circumferential periphery having a flange taper that is tapered inwardly intermediate the rod side of the pusher flange 28 and the pusher surface 27.

Preferably, the flange taper has a taper angle that is proximate the taper angle of the press-close taper 8. The pusher surface 27 includes a circumferential periphery that is predeterminedly larger than a circumferential periphery of a lock ring 3 in an open mode and the press-close taper 8 includes a taper angle which in congruency with a matching taper angle of the flange taper allows contact of the pusher surface 27 with a predetermined portion of the lock ring 3 in the open mode.

Figure 20:
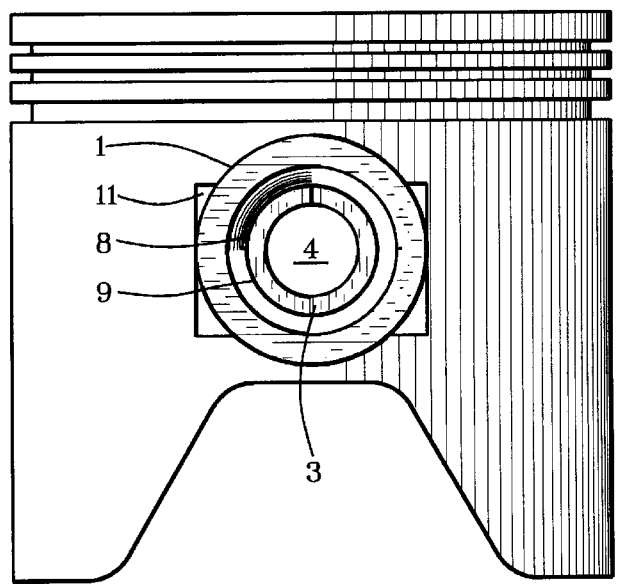
FIG. 20 is a side view the FIG. 19 illustration.

A method has the following steps for using the piston-pin lock-ring-insertion tool:

placing a lock ring 3 in a spring-pressured open mode that is shown in FIG. 5 in a feed position shown in FIG. 6 in the press-close taper 8 of the ring-insertion tube with a plane of the lock ring being about perpendicular to an axis of the press-close taper 8;

placing the pusher head 12 of the ring pusher 2 in contact with the lock ring 3;

sliding the lock ring 3 from the feed position in the press-close taper 8 to proximate the ring-guide bore 9 with the ring pusher 2 by application of force linearly on the ring pusher 2 with the pusher head 12 buttressed against the lock ring 3 for closing the lock ring 3 predeterminedly and for placing the lock ring 3 in position for sliding entry into the ring-guide bore 9 from the press-close taper 8;

removing the pusher head 12 from contact with the lock ring 3;

reversing the ring pusher 2 end-to-end;

inserting the slide rod 13 of the ring pusher 2 into an inside periphery of the lock ring 3;

pushing the lock ring 3 in the ring-guide bore 9 towards the ring-insertion end 7 of the ring-insertion tube 1 as shown in FIG. 7 by forcing the insertion plunger 14 against the lock ring 3 with force applied to the ring pusher 2 for causing a sufficient distance of travel of the center rod 15 in the ring-guide bore 9 to engage the piston-pin bore 4 shown in FIGS. 8–9;

aligning the ring-guide bore 9 with the piston-pin bore 4;

holding the perpendicularity surface 10 on the insertion end of the ring-insertion tube 1 against a surface that includes a flat surface 11 shown in FIGS. 17 and 20 surrounding the entrance to the piston-pin bore 4;

pushing the ring pusher 2 to push the lock ring 3 to an internal lock-ring groove 29 shown FIGS. 8–9 in the piston-pin bore 4; and allowing the lock ring 3 to expand radially into the lock-ring groove 29.

A new and useful piston-pin lock-ring-insertion tool and method having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A piston-pin lock-ring-insertion tool comprising:
a ring-insertion tube in working relationship to a ring pusher for inserting a lock ring into a lock-ring groove in a bore;
the ring-insertion tube having a ring-feeder end that is oppositely disposed from a ring-insertion end;
the ring-insertion tube having an inside periphery with a press-close taper that is internal and tapered inwardly with a predetermined taper angle from the ring-feeder end funneled to a ring-guide bore;
the ring-guide bore having an inside periphery that is cylindrical uniformly intermediate the press-close taper and a ring-insertion end of the ring-guide bore;
the press-close taper and the ring-guide bore having axes that are concentric;

the ring-guide bore having an inside periphery that is adapted for sliding contact of an outside periphery of the lock ring in a pressed-close mode from the press-close taper for being slid into an inside periphery of the piston-pin bore;

the ring-insertion end of the ring-insertion tube having a perpendicularity surface that is perpendicular to the axes of the press-close taper and the ring-guide bore for placing the perpendicularity surface against a flat surface surrounding an entrance to the piston-pin bore;

the ring pusher having a pusher head on a ring-feed end adapted for being buttressed against a side of the lock ring for pushing the lock ring from a major diameter of the press-close taper to a minor diameter of the press-close taper proximate a circumferential entrance to the ring-guide bore for closing the lock ring selectively;

the ring pusher having a slide rod that is oppositely disposed linearly from the pusher head;

the slide rod having a cylindrical outside periphery that slides against the inside periphery of the ring-guide bore;

the outside periphery of the slide rod being adapted for being inserted predeterminedly into an inside periphery of the piston-pin bore;

an insertion plunger on a circumferential step intermediate the outside periphery of the slide rod and a center rod on a ring-insertion end of the slide rod;

the center rod being extended concentrically from the slide rod; and the center rod being adapted for entry predeterminedly into the inside periphery of the lock ring.

2. The piston-pin lock-ring-insertion tool of claim 1 wherein:
the center rod includes a linear length that is at least a thickness of the lock ring.

3. The piston-pin lock-ring-insertion tool of claim 1 wherein:
the center rod includes an adjustable-length center rod.

4. The piston-pin lock-ring-insertion tool of claim 3 wherein:
the adjustable-length center rod includes a threaded stem having external helical threads that are screwed into internal helical threads in the slide rod.

5. The piston-pin lock-ring-insertion tool of claim 1 wherein:
the pusher head of the ring pusher includes a pusher surface that is perpendicular to an axis of the ring pusher;
the pusher head includes a pusher flange that is extended outward radially from the slide rod;
the pusher surface is on a ring-feed end of the of the ring pusher;
the pusher flange includes a predetermined flange width intermediate the pusher surface and a rod side of the pusher flange;
the pusher flange includes a laterally circumferential periphery having a flange taper;
the flange taper is tapered inwardly intermediate the rod side of the pusher flange and the pusher surface;
the flange taper has a taper angle that is proximate the taper angle of the press-close taper;
the pusher surface includes a circumferential periphery that is predeterminedly larger than a circumferential periphery of a lock ring in an open mode; and the press-close taper includes a taper angle which in congruency with a matching taper angle of the flange taper allows contact of the pusher surface with the predetermined portion of the lock ring in the open mode.

6. The piston-pin lock-ring-insertion tool of claim 5 wherein:
the center rod includes the adjustable-length center rod; and
the adjustable-length center rod includes the threaded stem having external helical threads that are screwed into the internal helical threads in the slide rod.

7. A piston-pin lock-ring-insertion tool comprising:
a ring-insertion tube in working relationship to a ring pusher for inserting a lock ring into a lock-ring groove in a piston-pin bore of a selected piston;

the ring-insertion tube having a ring-feeder end that is oppositely disposed from a ring-insertion end;

the ring-insertion tube having an inside periphery with a press-close taper that is internal and tapered inwardly from the ring-feeder end to a ring-guide bore;

the ring-guide bore having an inside periphery that is cylindrical uniformly intermediate the press-close taper and a ring-insertion end of the ring-guide bore;

the press-close taper and the ring-guide bore having axes that are concentric;

the ring-guide bore having an inside periphery that is adapted for sliding contact of an outside periphery of the lock ring in a pressed-close mode from the press-close taper for being slid into an inside periphery of the piston-pin bore;

the ring-insertion end of the ring-insertion tube having a perpendicularity surface that is perpendicular to the axes of the press-close taper and the ring-guide bore for the perpendicularity surface to be placed against a flat surface of a piston-wall depression that is perpendicular to the piston-pin bore surrounding an entrance to the piston-pin bore on either of opposite sides of the piston;

the ring pusher having a pusher head on a ring-feed end adapted for being buttressed against a side of the lock ring for pushing the lock ring from a major diameter of the press-close taper to a minor diameter of the press-close taper proximate a circumferential entrance to the ring-guide bore for closing the lock ring selectively;

the ring pusher having a slide rod that is oppositely disposed linearly from the pusher head;

the slide rod having a cylindrical outside periphery that slides against the inside periphery of the ring-guide bore;

the outside periphery of the slide rod being adapted for being inserted predeterminedly into an inside periphery of the piston-pin bore;

an insertion plunger on a circumferential step intermediate the outside periphery of the slide rod and a center rod on a ring-insertion end of the ring pusher;

the center rod being extended concentrically from the slide rod; and the center rod being adapted for entry predeterminedly into the inside periphery of the lock ring.

8. The piston-pin lock-ring-insertion tool of claim 7 wherein:
the center rod includes a circumferential outside periphery that is adapted for entry into an inside periphery of the piston pin in the piston for aligning an axis of the lock ring on the slide rod concentrically with an axis of the piston-pin bore.

9. The piston-pin lock-ring-insertion tool of claim 8 wherein:

the center rod includes a linear length that is adapted for entry predeterminedly into the inside periphery of the piston pin in the piston.

10. The piston-pin lock-ring-insertion tool of claim 7 wherein:

the center rod includes a linear length that is proximate a thickness of the lock ring.

11. The piston-pin lock-ring-insertion tool of claim 7 wherein:

the center rod includes an adjustable-length center rod.

12. The piston-pin lock-ring-insertion tool of claim 11 wherein:

the adjustable-length center rod includes a threaded stem having external helical threads that are screwed into internal helical threads in the slide rod.

13. The piston-pin lock-ring-insertion tool of claim 7 wherein:

the perpendicularity surface includes a perpendicularity boss positioned perpendicularly to at least one flat side wall; and the perpendicularity boss is positioned about a predetermined portion of the piston-pin bore on the ring-insertion end of the ring-insertion tube.

14. The piston-pin lock-ring-insertion tool of claim 13 wherein:

the flat side wall includes a first side wall on a first side of an open portion of the ring-guide bore and a second side wall on a second side of the open portion of the ring-guide bore; and the first side wall and the second side wall are in a common plane that is parallel to the axis of the ring-guide bore on oppositely disposed sides of the open portion of ring-guide bore.

15. The piston-pin lock-ring-insertion tool of claim 13 wherein:

the flat side wall includes a third side wall that is parallel to the axis of the ring-guide bore; and the third side wall defines a base of an arc at a predetermined distance laterally from the ring-guide bore.

16. The piston-pin lock-ring-insertion tool of claim 13 wherein:

the flat side wall includes a first side wall on a first side of an open portion of the ring-guide bore and a second side wall on a second side of the open portion of the ring-guide bore; and the first side wall and the second side wall are in a common plane that is parallel to the axis of the ring-guide bore on oppositely disposed sides of the open portion of ring-guide bore.

17. The piston-pin lock-ring-insertion tool of claim 13 wherein:

the flat side wall includes a third side wall that is parallel to the axis of the ring-guide bore;

the third side wall defines a base of an arc at a predetermined distance laterally from the ring-guide bore;

the flat side wall includes a first side wall on a first side of an open portion of the ring-guide bore and a second side w all on a second side of the open portion of the ring-guide bore; and the first side wall and the second side wall are in a common plane that is parallel to the axis of the ring-guide bore on oppositely disposed sides of the open portion of ring-guide bore.

18. The piston-pin lock-ring-insertion tool of claim 7 wherein:

the perpendicularity surface is positioned predeterminedly about the ring-guide bore on the ring-insertion end of the ring-insertion tube.

19. The piston-pin lock-ring-insertion tool of claim 18 wherein:

the ring-insertion tube includes a tube taper.

20. The piston-pin lock-ring-insertion tool of claim 19 and further comprising:

a positioning step in the tube taper;

the positioning step having a step wall that is perpendicular to the piston-pin bore at a position predeterminedly intermediate a surface of the tube taper and the piston-pin bore.

21. The piston-pin lock-ring-insertion tool of claim 7 wherein:

the pusher head of the ring pusher includes a pusher surface that is perpendicular to an axis of the ring pusher.

22. The piston-pin lock-ring-insertion tool of claim 21 wherein:

the ring pusher includes a pusher taper that is tapered inwardly at a taper angle that is proximate a taper angle of the press-close taper;

the pusher taper is extended from an outside edge of the pusher surface to proximate an outside periphery of the slide rod; and the outside edge of the pusher surface includes an external periphery that is predeterminedly smaller than an internal periphery of an internal major diameter of the press-close taper proximate the ring-feeder end of the ring-insertion tube for allowing predetermined entry of the pusher surface into the press-close taper.

23. The piston-pin lock-ring-insertion tool of claim 21 wherein:

the pusher head includes a pusher flange that is extended outward radially from the slide rod;

the pusher surface is on the ring-feed end of the of the ring pusher; and an outside edge of the pusher surface includes an external periphery that is predeterminedly smaller than the internal periphery of the internal major diameter of the press-close taper proximate the ring-feeder end of the ring-insertion tube for allowing predetermined entry of the pusher surface into the press-close taper.

24. The piston-pin lock-ring-insertion tool of claim 23 wherein:

the pusher flange includes a predetermined flange width intermediate the pusher surface and a rod side of the pusher flange;

the pusher flange includes a laterally circumferential periphery having a flange taper;

the flange taper is tapered inwardly intermediate the rod side of the pusher flange and the pusher surface;

the flange taper has a taper angle that is proximate the taper angle of the press-close taper;

the pusher surface includes a circumferential periphery that is predeterminedly larger than a circumferential periphery of a lock ring in an open mode; and the press-close taper includes a taper angle which in congruency with a matching taper angle of the flange taper allows contact of the pusher surface with a predetermined portion of the lock ring in the open mode.

25. The piston-pin lock-ring-insertion tool of claim 24 wherein:

the center rod includes the adjustable-length center rod.

26. The piston-pin lock-ring-insertion tool of claim 25 wherein:

the adjustable-length center rod includes the threaded stem having external helical threads that are screwed into the internal helical threads in the slide rod.

27. A method comprising the following steps for using the piston-pin lock-ring-insertion tool of claim 1:

placing a lock ring in a spring-pressured open mode in a feed position in the press-close taper of the ring-insertion tube with a plane of the lock ring being about perpendicular to an axis of the press-close taper;

placing the pusher head of the ring pusher in contact with the lock ring;

sliding the lock ring from the feed position in the press-close taper to proximate the ring-guide bore with the ring pusher by application of force linearly on the ring pusher with the pusher head buttressed against the lock ring for closing the lock ring predeterminedly and for placing the lock ring in position for sliding entry into the press-close taper from the ring-guide bore;

removing the pusher head from contact with the lock ring;

reversing the ring pusher end-to-end;

inserting the slide rod of the ring pusher into an inside periphery of the lock ring;

pushing the lock ring in the ring-guide bore towards the ring-insertion end of the ring-insertion tube by forcing the insertion plunger against the lock ring with force applied to the ring pusher for causing a sufficient distance of travel of the center rod in the ring-guide bore to engage the piston-pin bore;

aligning the ring-guide bore with the piston-pin bore;

holding the perpendicularity surface on the insertion end of the ring-guide bore against surface area surrounding the entrance to the piston-pin bore;

pushing the ring pusher to push the lock ring to an internal lock-ring groove in the piston-pin bore; and allowing the lock ring to expand radially into the lock-ring groove.

\* \* \* \* \*